United States Patent [19]
Inoue et al.

[11] 3,751,165
[45] Aug. 7, 1973

[54] PHOTOGRAPHIC CONTACT PRINTING DEVICE

[75] Inventors: Mutsuhiro Inoue, Sagamihara; Yoichi Takahashi, Tokyo, both of Japan

[73] Assignee: Canon Kabushiki Kaisha, Tokyo, Japan

[22] Filed: June 7, 1971

[21] Appl. No.: 150,679

[30] Foreign Application Priority Data
June 12, 1970 Japan................................ 45/50855
June 25, 1970 Japan................................ 45/55793
July 24, 1970 Japan................................ 45/64861

[52] U.S. Cl.................... 355/108, 355/83, 355/97, 355/104
[51] Int. Cl......................................... G03b 27/10
[58] Field of Search.............. 355/68, 80, 83, 104, 355/105, 106, 108, 111, 97

[56] References Cited
UNITED STATES PATENTS
2,052,624 9/1936 Harrison..................... 355/80 X
3,230,857 1/1966 Ritzerfeld et al................. 355/106
3,157,102 11/1964 Pfaff............................. 355/111
3,582,207 6/1971 Johnson et al................. 355/106 X

*Primary Examiner*—Fred L. Braun
*Attorney*—Joel Halpern

[57] ABSTRACT

An apparatus for duplicating an image-bearing original film onto an unsensitized copy film while continuously moving the two films. The apparatus includes main exposure device for projecting the images of the original film upon the copy film to thereby reproduce the images on the copy film, a feed mechanism for feeding the two films at the same speed into the main exposure device, detecting elements for detecting the density of the images of the original film, an auxiliary exposure device for providing a uniform exposure to the surface of the copy film, and control members associated with the detecting elements for controlling the auxiliary exposure provided by the auxiliary exposure device in accordance with the detection output of the detecting elements, whereby the copy film is subjected to a uniform auxiliary exposure in accordance with the image density of the original film, thereby forming latent copy images of a uniform density on the copy film irrespective of the image density of the original film.

11 Claims, 14 Drawing Figures

PHOTOGRAPHIC CONTACT PRINTING DEVICE

BACKGROUND OF THE INVENTION

1. Field of the Invention

This invention relates to a roll duplicator for copying an original film onto a copy film by bringing the two films into intimate contact with each other, and more particularly to such a roll duplicator capable of correcting any density irregularity which may be present in the images on the original film during a copying operation.

2. Description of the Prior Art

An original film carrying thereon a series of information to be copied onto a roll of copy film may generally contain some density irregularity from information to information stored in the frames of the original film. For example, a microfilm or the like as the original film would often carry thereon information representing documents or drawings and the information recorded on such original film would contain an irregularity ranging from 0.9 to 1.5 for a density D. In copying such an original film onto a roll of copy film, the exposure to which the roll film is to be subjected must be adjusted by varying the quantity of light from a light source for copying in accordance with the density irregularity of the information recorded in the successive frames of the original film. For a density of 1.5, the quantity of light required for exposure will be as great as four times that required for a density of 0.9. In fact, however, it is extremely difficult to vary the quantity of light to such a great extent.

In the past, adjustment has also been accomplished by controlling exposure time rather than quantity of light, but this is time-consuming where various processes of exposure, development and fixing should take place in succession as in the case of roll film duplication.

SUMMARY OF THE INVENTION

It is a general object of the present invention to eliminate the above-described disadvantages which have existed in the prior art.

It is another object of the present invention to provide an apparatus which can adjust exposure in accordance with the image density of an original film to thereby provide excellent copies.

It is still another object of the present invention to provide an apparatus which can subject the entire surface of a copy film uniformly to auxiliary exposure in accordance with the density of the images recorded on an original film and vary the $\gamma$ characteristic of the copy film so that the images on the original film are transferred onto the copy film at a predetermined density in accordance with the density of the original images.

It is yet another object of the present invention to provide an apparatus which can detect the density of the image recorded in each frame of an original film and, in accordance with the detection signal, control auxiliary exposure so as to be uniformly provided on the entire surface of a copy film.

It is a further object of the present invention to provide an apparatus which can detect the density of each image on an original film and delay the detection signal so that exposure may take place in synchronism with the arrival of the original film at exposure position.

It is still a further object of the present invention to provide an apparatus which can record, on an endless recording medium, information representing the density of each image on the original film and delay the detection of such density information by a predetermined length of time so that an auxiliary exposure to a quantity of light determined in accordance with the detected density information may be uniformly provided on the entire surface of a copy film in synchronism with the arrival of the original film at exposure position.

These and other objects and features of the present invention will become fully apparent from the following detailed description of various embodiments thereof taken in conjunction with the accompanying drawings.

DESCRIPTION OF THE PREFERRED EMBODIMENTS

Figure 1:
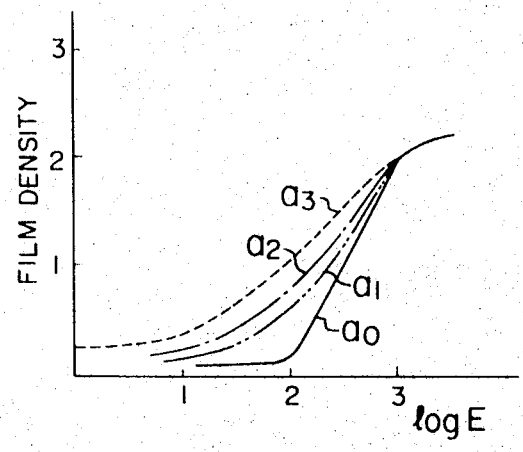
FIG. 1 is a graph illustrating the auxiliary exposure effect provided according to the principle on which the present invention is based.
Figure 2:
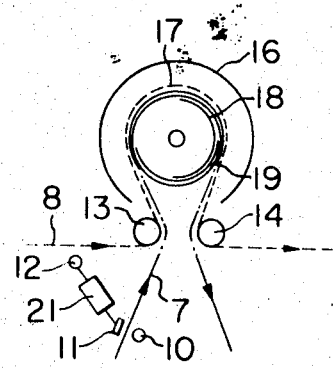
FIG. 2 is a schematic view showing an embodiment of the present invention.

Referring to FIG. 1, the relationship between the main exposure and the density of a copy film is graphically illustrated with the abscissa representing the logarithm of main exposure E and the ordinate representing the density of the copy film.

When the copy film is subjected to a main exposure by projecting an image of an original film upon the copy film or by bringing the copy film and the original film into intimate contact, the main exposure E is applied to the copy film in proportion to the density of the image on the original film. As a result, an image having a density D as represented by curve $a_0$ is formed on the copy film in accordance with the logarithm of the exposure E, i.e. log E. The density vs. main exposure characteristic, namely, D-log E is characterized by its rising gradient which is generally referred to as "$\gamma$ value", and such $\gamma$ value is primarily inherent to the film. For the films such as microfilms which require no half-tone reproductivity, a higher $\gamma$ value is usually desired.

Although any film has its own inherent D-log E characteristic, if the entire surface of the film is subjected to a uniform exposure (hereinafter referred to as "auxiliary exposure" just before or just after the main exposure, then the D-log E characteristic will be varied in accordance with the extent of the auxiliary exposure. For example, if provided just before the main exposure, the auxiliary exposure will be increased in amount while the γ value of the film will be gradually decreased as indicated by curves $a_1$, $a_2$ and $a_3$ in FIG. 1, with a result that the density D of the image reproduced on the film is greater for the same main exposure E. Such principle is already known.

The present invention applies this principle to a roll duplicator in order to successively reproduce the images of an original film on a copy film at a predetermined image density, and it is characterized in that the density of the images recorded on the original film is detected and an auxiliary exposure proportional to the detected density is applied to the copy film before or after the main exposure to thereby vary the γ value of the copy film so as to ensure successive images to be reproduced at a uniform density on the copy film. For example, when the density of the images recorded on the original film is low, the copy film is subjected to a greater amount of auxiliary exposure so as to provide a slow gradient as indicated by the curve $a_3$ whose bottom portion is lifted, thereby ensuring a copy of high density to be provided on the copy film irrespective of the low density images on the original copy which would otherwise result in a small amount of main exposure.

Figure 3:
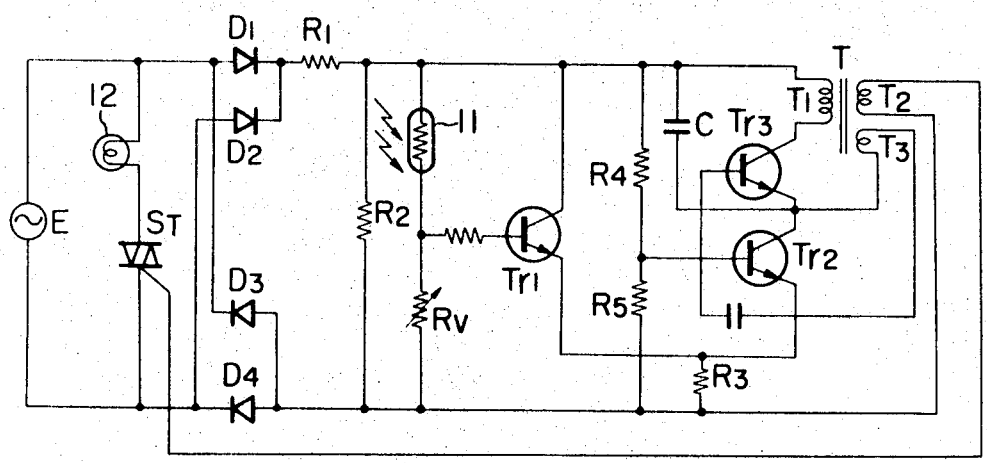
FIG. 3 is a block diagram of the light control circuit.
Figure 4:
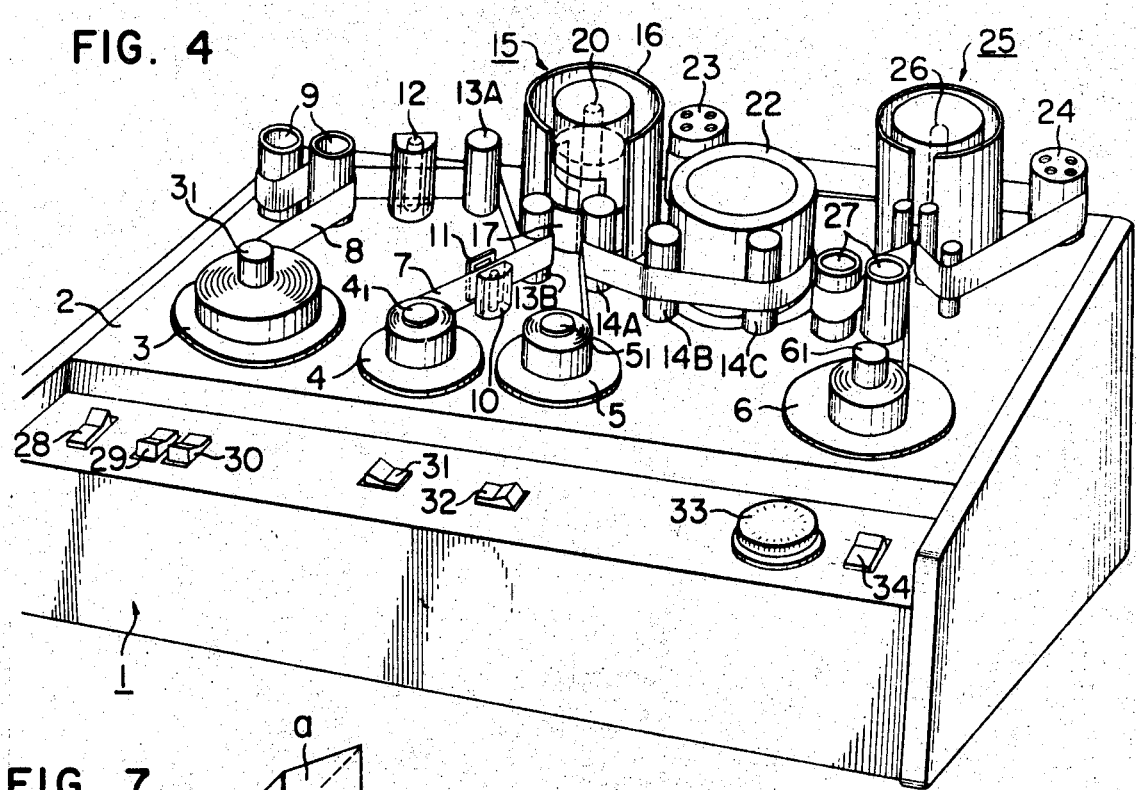
FIG. 4 is a perspective view of the entire roll duplicator equipped with the apparatus of FIG. 2.

Referring now to FIGS. 2 to 5, there is shown a roll duplicator together with its essential parts for continuously reproducing images at a predetermined density by utilizing the above-described principle. In FIG. 4, the roll duplicator includes a base housing 1, an upper panel 2 forming a part of the housing 1, a copy film supply turn table 3 mounted for rotation on a shaft $3_1$ journalled to the upper panel 2, an original film supply turn table 4 mounted for rotation on a shaft $4_1$ also journalled to the panel 2, an original film take-up turn table 5 mounted for rotation on a drive shaft $5_1$ driven from a motor (not shown) housed below the panel 2, and a copy film take-up turn table 6 mounted for rotation on a drive shaft $6_1$ driven from a motor (not shown) housed below the panel 2. An original film 7 such as prephotographed microfilm is wound on the turn table 4 around its shaft $4_1$ and supplied therefrom to the adjacent take-up turn table 5. An unexposed copy film 8 such as diazo-film or air bubble microfilm known as Kalvar film (tradename) produced and sold by Kalvar, Inc. is wound on the turn table 3 around its shaft $3_1$ and supplied therefrom to the take-up turn table 6. A pair of friction rollers 9 is provided on the upper panel 2 at the left-hand side thereof as viewed in FIG. 4, one of the rollers having a surface of greater friction coefficient than that of the other roller and being rotatably mounted. An illuminating light source 10 comprising a tubular tungsten lamp is provided on the panel 2 along the path of the original film 7 from the turn table 4 in such a manner that the light source 10 is exactly opposed to one of the successive prerecorded frames of the original film. In opposed relationship with the light source 10, there is disposed a photoresponsive element such as CdS cell 11 with the original film 7 interposed therebetween. Thus, when energized, the light source 10 will illuminate one of the frames of the original film 7 so that light is transmitted through the film in accordance with the density of the image on that frame of the film and received by the cell 11.

Along the path of the copy film 8 from the turn table 3 and adjacent to the friction rollers 9, there is provided an auxiliary exposure light source 12 comprising a tubular lamp whose quantity of light may be varied by a light control circuit, which will be described later. The auxiliary exposure light source 12 is disposed in opposed relationship with the copy film 8 so as to uniformly illuminate each entire frame of the film 8. The light source 12 may produce light of a wavelength which sensitizes the film as copy film. Guide rollers 13A and 13B are floatably mounted on the panel 2 by means of unshown mechanism. The photoresponsive cell 11 and the auxiliary exposure light source 12 are located so that the lengths of the films 7 and 8 as measured from the guide roller 13B to the cell 11 and to the light source 12, respectively, are equal to each other. Further guide rollers 14A, 14B and 14C are also floatably monunted on the panel 2.

Figure 5:
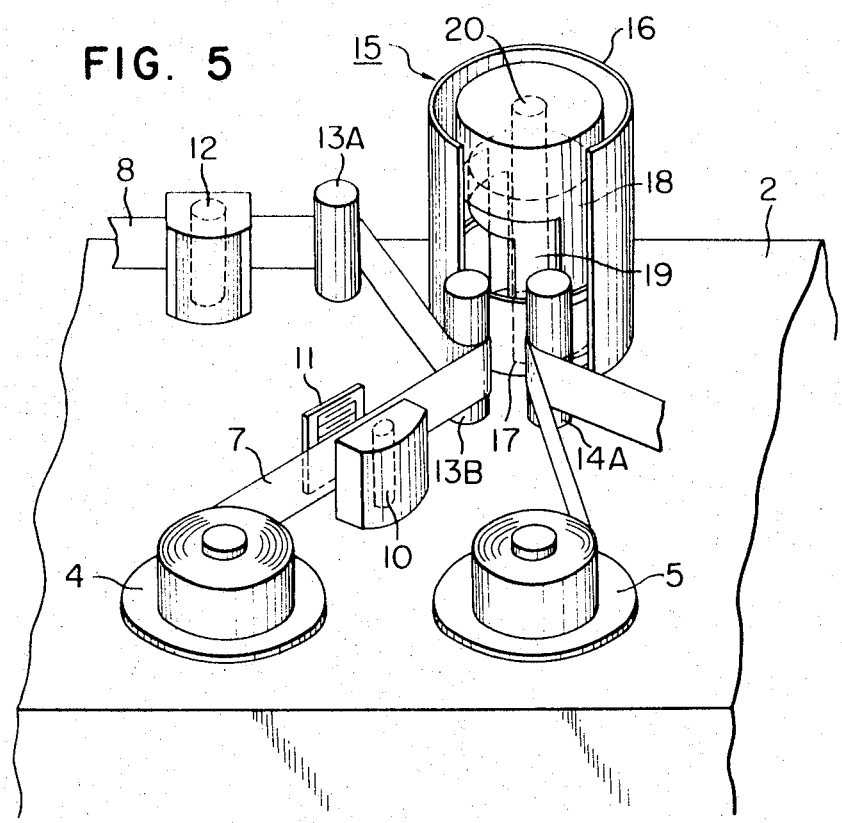
FIG. 5 is a fragmentary, enlarged perspective view showing the essential parts of the duplicator of FIG. 4.
Figure 8:
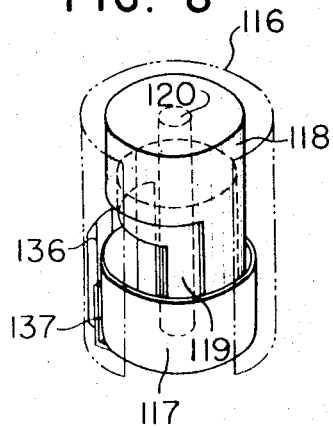
FIG. 8 is a perspective view of the device shown in FIG. 6.

A main exposure unit 15 is generally designated by numeral 15 in FIG. 4 and shown in greater detail in FIG. 5. The main exposure unit 15 comprises a cylindrical light-intercepting member 16 whose side wall is partly cut away to provide an opening at the part thereof confronting the guide rollers 13B and 14A. Concentrically mounted within the light-intercepting member 16 is a transparent cylinder 17 formed of adiabatic glass such as Pyrex glass (tradename), and the films 7 and 8 are guided and wrapped one upon the other around the cylinder 17. Stop cylinders 18 and 19 are mounted concentrically within the transparent cylinder 17, and each of these cylinders 18, 19 is cut away at the lower half portion thereof to provide an opening so that when the cylinder 18 is rotated from outside thereof the openings formed in the respective cylinders are varied in their relative position so as to vary the width of a slit defined by the two openings (see FIG. 2). Centrally located within the cylinder 19 is a main exposure light source 20, which may be an ultraviolet ray tube such as xenon tube if the copy film in use is a diazo-film such as Kalvar film or the like.

A thermal developing drum 22 having a heater block therein is provided so that the copy film leaving the main exposure unit 15 may be thermally developed by the drum 22 while being guided along and in contact with the outer side wall thereof. Cooling rollers 23 and 24 each shaped like a hollow cylinder having a perforated top end face are further provided on the panel 2 so that ambient air may be sucked into these cooling cylinders through their top perforations by unshown blowers mounted therewithin and driven from an unshown motor mounted below the panel 2, thus providing an enhanced cooling effect.

A fixing unit 25, which comprises a cylindrical light-intercepting member similar to that of the main exposure unit 15 and a light source 26 producing light of the same wavelength as the light source 20 of the main exposure unit, is also provided on the panel 2 for fixing the images on the copy film 8 subjected to the preceding developing process. A pair of friction rollers 27 similar to the aforesaid friction rollers 9 is further provided on the panel 2 at the right-hand side thereof as viewed in FIG. 4.

On the front operating board of the roll duplicator, there are arranged in a row various operating means, i.e. power switch 28, switch 29 for the main exposure and fixing light sources, switch 30 for the light source 10, photoresponsive cell 11 and auxiliary exposure light source 12, control switches 31 and 32 for maintaining a predetermined tension of the original film 7, film speed control dial 33, and film drive switch 34.

Among these, the control switches 31 and 32 have no direct relation with the present invention and their description is omitted herein.

During operation, the original film 7 and the copy film 8 are guided separately except in the main exposure unit 15 where the two films are moved in overlapping relationship as seen in FIG. 4, so that the images on the original film are reproduced on the copy film. The dial 33 is initially set in accordance with the sensitivity of the copy film 8 in use, and then the switches 28, 29, 30 and 34 are depressed to drive the turn tables 5 and 6 for rotation so that the films 7 and 8 are moved at the same speed under the control of an unshown tension control mechanism. Thus, the copy film 8 travels from the supply turn table 3 through the auxiliary exposure station 12 and the main exposure unit 15 and then over the developing roller 22 and cooling roller 23 into the fixing unit 25, whereafter the copy film is taken up around the shaft $6_1$ on the take-up turn table 6.

FIG. 3 shows the light control circuit of the auxiliary light source whose light is controlled by the photoresponsive cell 11. As shown therein, the circuit includes a commercially available AC source E, a bidirectional semiconductor control rectifier element ST known as Triac (tradename), fullwave rectifier diodes DI, D2, D3 and D4, voltage dividing fixed resistors R1, R2, R3, R4 and R5, a variable adjust resistor Rv connected in series with the cell 11, transistors Tr1 and Tr2 forming a differential amplifier circuit, and a transistor Tr3 for a blocking oscillation circuit formed by a capcitor C and a coupling pulse transformer. In the circuit arrangement described above, the resistance value of the cell 11 is decreased when the amount of light received by the cell is small (i.e. when the density of the image on the original film is low), so that the AC voltage from the source E is rectified into a DC voltage through diodes D1–D4 and voltage dividing resistors R1 and R2 and the DC voltage is further divided by the cell 11 and by the variable resistor Rv. Therefore, as the resistance of the cell 11 is decreased, the base potential of the transistor Tr1 is increased to admit an increased amount of base current into the transistor Tr1, which in turn increases its emitter current. Thus, the emitter potential of the transistor Tr2 is also increased by the resistor R3. Since a predetermined level of base bias resulting from the fixed resistors R4 and R5 is applied to the base of the transistor Tr2, the collector current of the transistor Tr2 is decreased as the emitter potential is increased and accordingly, the charging current of the capacitor C connected in series with the collector circuit of the transistor Tr2 is also decreased to dely the charging time.

As the charging of the capacitor C progresses, the emitter potential of the transistor Tr3 is decreased until this transistor is rendered conductive to admit a driving current into the primary winding T1 of the pulse transformer, which thus generates a pulse in its secondary winding T2. The pulse renders the Triac ST conductive to turn on the auxiliary exposure light source 12. More specifically, the Triac ST conducts at a high level of the AC voltage applied from the AC voltage source E to the light source 12 because the pulse applied to the gate of the Triac is delayed in phase, and thus the light source 12 is turned on. As a result, the light of the light source 12 is diminished to decrease the auxiliary exposure to which the copy film 8 is subjected. Conversely, if the image on the original film 7 is of a high density, the result will be converse to that described just above, that is, the gate pulse generated by the pulse transformer is advanced in phase so that the Triac ST conducts at a low level of the AC voltage to thereby increase the intensity of light of the light source 12.

In the above-described arrangement, when the film 7 and 8 start to be fed, the density of each successive image on the original film 7 is detected by the cell 11 and in accordance with the detected density, the amount of light of the auxiliary exposure light source is varied by the light control circuit shown in FIG. 3, so that the copy film 8 is subjected to such a controlled auxiliary exposure prior to a main exposure. Subsequently, the original film 7 and the copy film 8 thus subjected to the auxiliary exposure are overlapped in intimate contact with each other while moving together around the glass cylinder 17 in the main exposure unit 15, where the images on the original film 7 are successively transferred onto the copy film 8. Since, as noted above, the cell 11 and the auxiliary exposure light source 12 are located so that the lengths of the films as measured from the guide roller 13B to the cell 11 and the light source 12 respectively are equal, the two overlapped films 7 and 8 can have their respective frames exactly registered with each other when they are subjected to a main exposure by the main exposure light source 20. Thus, irrespective of the magnitude of the density of the images on the original film 7, these images may be transferred onto the copy film 8 at a predetermined density and the copy film 8 may be subjected to the main exposure at a uniform density. Thereafter, the copy film 8 is developed and fixed by the developing roller 22 and the fixing unit 25, respectively, and finally taken up by the take-up turn table 6. In this way, image reproduction of a uniform density has been accomplished on the copy film 8.

Figure 7:
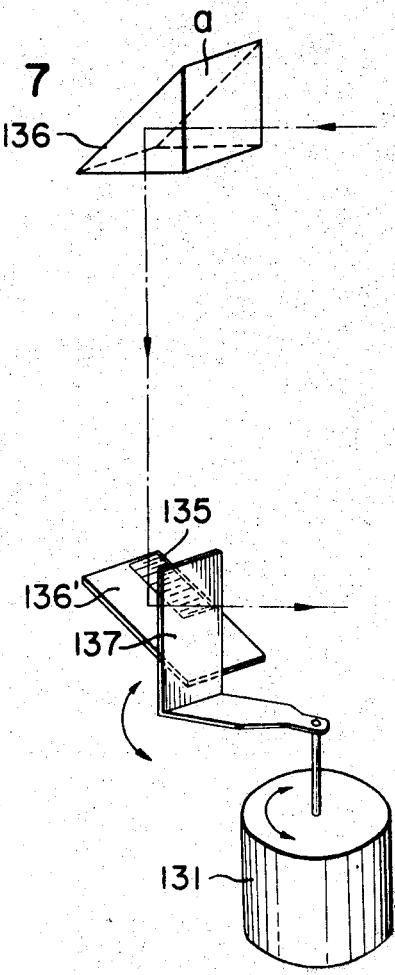
FIG. 7 is a schematic perspective view illustrating the essential parts of the apparatus of FIG. 6.
Figure 6:
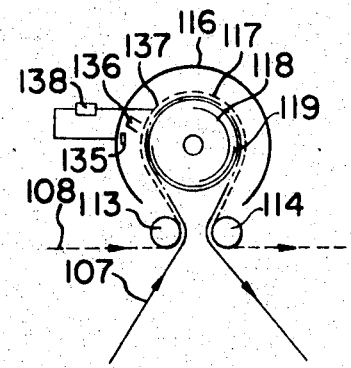
FIG. 6 is a schematic view of another embodiment of the present invention.

FIG. 6 shows a modified arrangement of the original film density detecting means and the auxiliary exposure means in the roll duplicator described above. This modified arrangement is similar to the previous embodiment except that the main exposure light source also serves as the auxiliary exposure light source, thereby eliminating the need to provide an additional light source for the auxiliary exposure. As shown in FIG. 6, there is employed an auxiliary exposure light guide 136, which is shown more particularly in FIG. 7. One end of the light guide 136 provides a reflecting surface $a$ for reflecting part of the light from a main exposure light source 120 toward a copy film 108 and directing it parallel to the copy film 108. A half-mirror 136' is disposed at an angle with respect to the films 107 and 108 travelling in overlapped relationship. Between the half-mirror 136' and the films 107, 108 there is movably disposed a douser 137. Behind the half-mirror 136' is provided a photoresponsive cell 135 to receive light transmitted from the main exposure light source 120 through the original film 107 and the copy film 108 via the half-mirror 136'. The cell 135 serves to energize a servo circuit, shown in FIG. 9 and later described, thereby causing the douser 137 to displace so as to control the quantity of light for auxiliary exposure which is directed to the copy film 108 after reflected by the reflecting surface $a$ of the light guide 136 and the half-mirror 136'.

Operation of this embodiment will now be described. The original and copy films 107 and 108 are driven to move at the same speed in the directions indicated by respective arrows in FIG. 6. The two films meet at a guide roller 113, and then are guided along it and further around the glass cylinder 117 in overlapped relationship so that they are exposed to light from the light source 120 while so moving around. The control of such main exposure is accomplished by the adjustment of the speed of the moving films 107, 108 and of the dimensions of the slit defined by light-intercepting walls 118 and 119, which are similar to those of the previous embodiment. When the main exposure begins to take place for the films 107 and 108, the cell 135 for detecting the light transmitted through the two films detects the quantity of light passed through the sensitive material of the copy film 108. In accordance with the output of the cell 135, the position of the douser 137 disposed between the light guide 136 and the film 108 is adjusted by the light control circuit 138 so that a predetermined extent of auxiliary exposure may be applied to a corresponding part of the copy film 108. When the images on the original film 107 are of a high density, the douser 137 is opened to increase the auxiliary exposure light for the copy film 108 and accordingly increase the sensitivity thereof. Thus, irrespective of any irregular density present in the original film 107, the copy film 108 can provide a copy of a predetermined density.

Although the embodiment now under discussion uses the light guide 136 having a reflecting surface provided by one end face thereof, it is also possible to substitute a prism, fiber glass or the like for such light guide or to omit such means and vary the brightness of the light source itself.

The auxiliary and main exposures take place substantially simultaneously in the above embodiment, but the auxiliary exposure may take place for any portion of the copy film corresponding to the original film anywhere between the cell and the developing means.

Further, the direction in which the auxiliary exposure light is projected upon the film may be selected as desired, for example, such light may be imparted from the emulsion-coated surface of the film instead of the sensitive surface.

Figure 9:
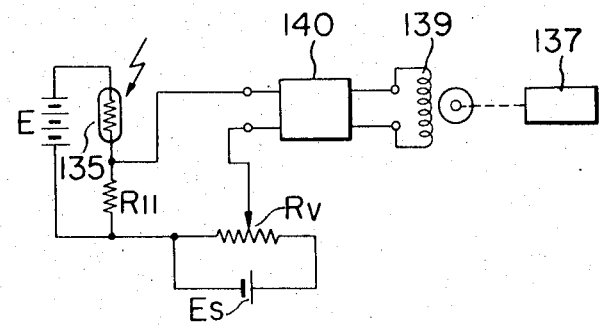
FIG. 9 is a block diagram of the light control circuit in the embodiment of FIG. 6.

A known servo circuit may be used to drive the douser 137, although the present invention employs an electric circuit as shown in FIG. 9. The shown circuit includes the CdS cell 135 similar to the cell 11 of the previous embodiment, a voltage dividing resistor R11 connected in series with the cell 135 and also connected with a DC source E, a DC rectifier circuit 140, a variable resistor Rv, and a standard voltage generating source Es. The resistor Rv is preset in accordance with the sensitivity of the copy film 108, and the potential of the amplifier 140 preset to its standard level is supplied to the circuit. When the resistance value of the cell 135 is varied in accordance with the density of the images on the original film, a servo motor 131 is energized through the amplifier 140 in accordance with the variation in the potential divided by the cell 135 and resistor R11, whereby the douser 137 is controlled in accordance with the image density of the original film detected by the cell 135.

Figure 10:
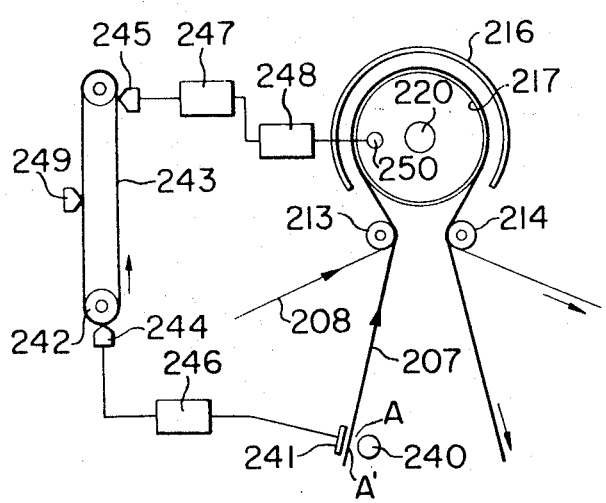
FIGS. 10 to 12 are schematic views of further embodiments of the present invention.
Figure 13:
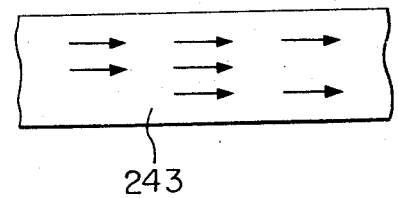
FIGS. 13 and 14 are the plots of the density detection signals provided according to the present invention.

In the embodiments described so far, detecting means for the image density of the original film and the auxiliary exposure means having the auxiliary exposure light source therein must be located at an equal distance in the paths of the respective films. This is, however, very difficult to do in the roll duplicator of the described type in which various members are provided on a common panel. Such a difficulty can be overcome by a modification as shown in FIG. 10. Referring to FIG. 10, means for detecting the image density of an original film 207 comprises a light source 240 and a photoresponsive cell 241, and a delay mechanism for delaying the detection signal of the detector means comprises an endless magnetic recording medium 243 driven by a roller 242, and a writing head 244 and a reading head 245. In this arrangement, when the original film 207 passes through the density detecting position A, the cell 241 produces an output in accordance with the quantity of light transmitted from the light source 240 through the original film in the manner described previously, and the output is applied through an A-D converter 246 to the writing head 244, which thus records the output on the magnetic medium 243 in the form of bit information as shown in FIG. 13.

The speed of movement of the recording medium 243 is made equal to that of the original film 207 and the distance between the writing head 244 and the reading head 245 is made equal to the distance between the density detecting position A and the exposure means 220. Therefore, when the point A' of the original film which has been detected for density reaches the exposure means 220, the reading head 245, decoder 247 and control circuit 248 are energized to control a light source 250 in accordance with the density information recorded on the recording medium 243. In the meantime, the recording medium 243 passes through the reading head 245, whereafter it moves round to an erasing head 249 which erases the density information on the medium 243.

Figure 14:
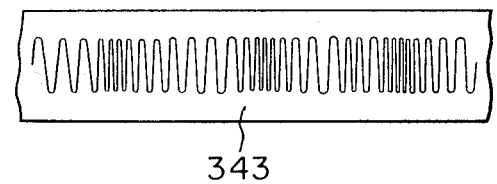

The A-D converter 246 may be replaced by a combination of amplifier and frequency modulation circuit so that the density information may be recorded in the form of frequency variation as shown in FIG. 14. Such information may be reproduced by a combination of amplifier, modulation circuit and control circuit, provided instead of the reading head 245 and decoder 247, thereby controlling the light source 250.

Figure 11:
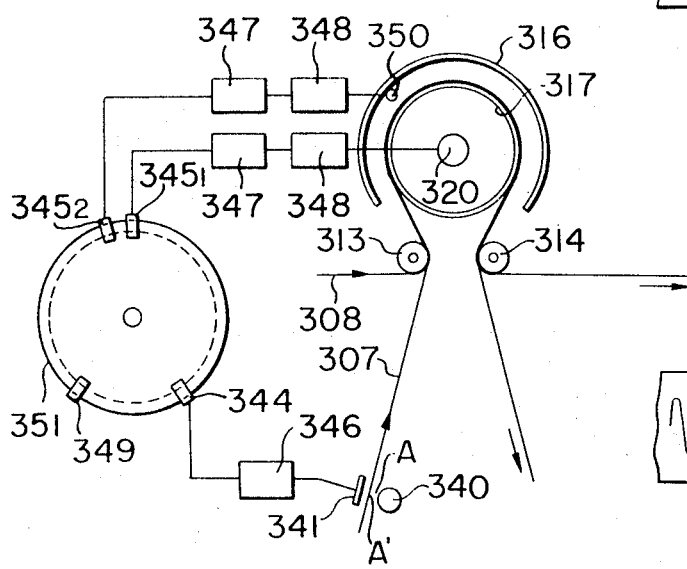

FIG. 11 shows a further embodiment of the present invention which is similar to the embodiment of FIG. 10 except that a magnetic disc 351 is employed instead of the endless magnetic recording medium 243 and two reading heads $345_1$ and $345_2$ are provided, one for adjusting the quantity of light of the main exposure light source 320 and the other for adjusting the auxiliary exposure light source 350. The peripheral speed of the magnetic disc 351 along the dotted circular line and the speed of the original film 307 are made equal to each other, and the distance between the recording portion of the writing head 344 and that of the reading heads $345_1$, $345_2$ is made equal to the distance between the density detecting position A and the main exposure or the auxiliary exposure position. As a result, the quantity of light of the light sources 320, 350 can be controlled in accordance with the density of the original film 307 and the exposure allowance is increased by the controlled auxiliary exposure.

Figure 12:
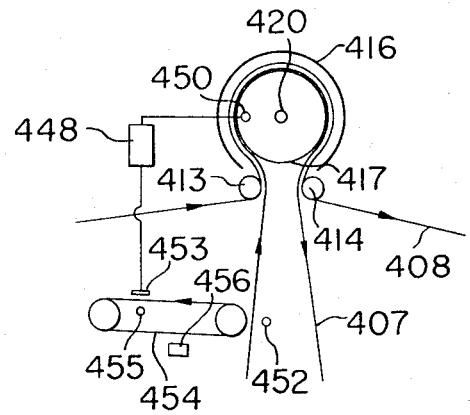

FIG. 12 illustrates a further embodiment of the roll duplicator in which the images on the original film are transferred onto a separate recording medium a predetermined time before the detection of the density of the original film. More particularly, FIG. 12 is an exemplary illustration of the main exposure unit and the image density detecting means for the original film. In FIG. 12, an original film 407 is moved in the direction of arrow between a source of short wavelength light 452 and an endless film of photochromic sensitive material 454 driven in the direction of its arrow, so that the successive images of the original film 407 opposed to the light source 452 are successively transferred onto the endless film 454 in accordance with the density of those original images. The time required for each image of the original film 407 opposed to the light source 452 to reach the exposure position is determined by the speed of movement of the original film and the distance from the light source 452 to the exposure position, and therefore the distance between each image reproduced on the endless film 454 and the photoresponsive cell 453 is made equal to the distance between the light source 452 and the exposure position and the speed of movement of the original film 407 is made equal to that of the endless film 454. In other words, the time required for the original film 407 to travel from the light source 452 to the exposure position is made equal to the time required for the endless film 454 to travel from the light source 452 to the cell 453. A density measuring light source 455 is disposed inside the loop of the endless film 454, and this light source 455, together with the detector element 453, constitutes a density detecting means. The detector element 453 produces a signal in accordance with the density of each image on the endless film 454, i.e. the density of each image on the original film 407. A light control circuit 448, which is similar to that shown in FIG. 3, is provided to control the quantity of light of the light source 450 in accordance with the signal from the detector element 453. A source of heat or long wavelength light 456 is also provided along the path of the endless film for successively erasing the copy images thereon after passing the density detecting means.

When the images successively transferred from the original film 407 onto the endless film 454 at the light source 452 in accordance with the density of the original images are passed between the detector element 453 and the light source 455, the cell 453 produces successive signals in accordance with the density of the images on the endless film, i.e. the density of the images on the original film 407, and the light control circuit 448 is controlled by these successive signals so as to adjust the quantity of light of the light source 450 in accordance with the density of the images on the original film 407. As a result, the successive images on the original film 407 are exposed to the light from the source 450 controlled in accordance with their density, resulting in a uniform density of the images transferred on to the copy film 408. The images once formed on the endless film 454 are successively erased by the source of heat or long wavelength light 456 after they have passed the density detecting means.

The light source 452 may be arranged so that the image transfer from the original film 407 onto the endless film 454 may be accomplished by a through-slit exposure. In that case, the speed of the endless film may be made slower and accordingly the entire apparatus may be made compact. In addition, the density of the original film may be measured as average and this would further enhance the exposure control effect.

While the foregoing various embodiments have been shown and described as employing a copy film such as diazo-film suitable for the dry type developing and fixing processes, the present invention does not restrict the type of the copy film to be used, but includes the use of other film suitable for the wet type treatment. Also, instead of the photoresponsive element used to detect the image density of the original film, the use of any other photoelectric converter element such as PN diode or the like would achieve the same result.

According to the present invention, it will be appreciated, the entire surface of the copy film moved at the same speed as the original film is exposed to light in accordance with the image density on the original film so as to vary the characteristic of the copy film, thereby providing continuous image reproduction of a uniform density, and this leads to a greatly simplified copying procedure as well as to a high efficiency for the continuous reproduction of numerous images to be copied.

We claim:

1. A duplicating apparatus for copying an image-bearing original film onto an unexposed copy film while continuously feeding the two films, said apparatus comprising:
   main exposure means adapted to emit light and thereby project the images of said original film upon said copy film to thereby reproduce said images on said copy film;
   feed means for feeding said two films at the same speed into said main exposure means;
   detecting means for detecting the density of the images recorded on said original film fed by said feed means;
   auxiliary exposure means for providing a uniform exposure to the entire surface of said copy film fed by said feed means; and
   control means associated with said detecting means for controlling the extent of the exposure provided by said auxiliary exposure means in accordance with the detection output of said detecting means;
   whereby said copy film is subjected to a uniform auxiliary exposure in accordance with the image density of the original film to be copied, thereby forming latent copy images of a uniform density on said copy film irrespective of the image density of said original film.

2. Apparatus according to claim 1, wherein said detecting means includes a light source for illuminating said original film, and a photoelectric converter element for receiving light transmitted from said light source through the images on said original film and converting the density of said images into an electric signal, said photoelectric converter element and said auxiliary exposure means being disposed along the paths of said original and copy films respectively, at an equal distance with respect to said main exposure means.

3. Apparatus according to claim 1, wherein
   said main exposure means includes a guide member for causing said original and copy films to overlap each other, and a main exposure light source for illuminating said original film as it is moved in overlapped relationship with said copy film, thereby reproducing the images of said original film on said copy film;
   said auxiliary exposure means includes a light directing member for directing part of the light from said main exposure light source to the recording surface of said copy film; and
   said control means includes light-controlling means disposed in the optical path between said light directing member and said copy film for controlling the quantity of light directed by said light directing member, whereby said control means controls the auxiliary exposure in accordance with the image density of said original film detected by said detector means.

4. Apparatus according to claim 3, wherein said copy film overlapped with said original film at a location where the latter film is illuminated by said main exposure light source is subjected to an auxiliary exposure through said light directing member.

5. Apparatus according to claim 4, wherein said detecting means includes a photoelectric converter element disposed so as to receive light transmitted from said main exposure light source through the images on said original film, said photoelectric converter element producing an electric signal output representing the image density of said original film during the main exposure, said signal output being applied to said control means to control said light controlling means so as to control the auxiliary exposure in accordance with the image density of said original film.

6. Apparatus according to claim 1, wherein
said auxiliary exposure means includes a light source disposed so that the entire surface of said copy film may be uniformly exposed to the light from said light source; and
said control means includes a light control circuit whose output is connected with said auxiliary exposure light source and whose input is connected with said detecting means to control said auxiliary exposure light source so as to produce a quantity of light in proportion to the image density of said original film detected by said detecting means.

7. Apparatus according to claim 1, wherein said detecting means includes:
a photoelectric converter element for receiving light transmitted through the images on said original film and converting such transmitted light into an electric signal; and
magnetic recording-reproducing means comprising an endless magnetic recording medium driven at a predetermined speed for magnetically recording thereon said electric signal from said photoelectric converter element, a recording circuit for magnetically recording said electric signal on said medium, a recording head connected with the output of said circuit and opposed to said magnetic recording medium, and a reproducing head for reproducing said signal recorded on said magnetic recording medium, said reproducing head being connected with said control means;
whereby said magnetic recording-reproducing means delays said signal produced by said photoelectric converter element in proportion to the image density of said original film, to thereby operate said control means so as to correct the positions of said photoelectric converter element and said auxiliary exposure means relative to said main exposure means.

8. Apparatus according to claim 7, wherein
said auxiliary exposure means is disposed at a position where said copy film is subjected to the exposure by said main exposure means;
said endless magnetic recording medium is driven at the same speed as said original film; and
the length of said recording medium between said recording head and said reproducing head, both opposed to said medium, is equal to the length of said original film between said photoelectric element and said main exposure means.

9. Apparatus according to claim 7, wherein an erasing means is disposed along the path of said magnetic recording medium downstream of said reproducing head for erasing the information on said medium after having passed said reproducing head.

10. Apparatus according to claim 1, wherein said detecting means comprises:
means for transferring the images of said original film including:
an endless photo-reversible recording medium for recording images thereon,
means for driving said recording medium at the same speed as said original film,
transfer exposure means for exposing said recording medium to light of a wavelength capable of sensitizing said medium, said transfer exposure means illuminating the images of said original film to thereby project and record said images upon said recording medium, and
means for erasing said images recorded on said recording medium; and
means for photoelectrically converting the image density of said original film including:
a photoelectric converter element disposed between said transfer exposure means and said erasing means for converting the density of images transferred from said original film onto said recording medium into an electric signal and applying such signal to said control means, the images on said original film whose density has been detected being applied as an auxiliary exposure to said copy film in accordance with the interval between said photoelectric converter element and said transfer exposure means.

11. Apparatus according to claim 10, wherein said recording medium comprises a photochromic film, said transfer exposure means includes a source of ultraviolet rays, and said erasing means includes a source of infrared rays.

* * * * *